March 26, 1957 H. ARMITAGE 2,786,312
WORK FORMING APPARATUS
Filed May 19, 1955 7 Sheets-Sheet 3

United States Patent Office 2,786,312
Patented Mar. 26, 1957

2,786,312

WORK FORMING APPARATUS

Harry Armitage, Murraysville, Pa.

Application May 19, 1955, Serial No. 509,489

6 Claims. (Cl. 51—101)

This application relates to work forming apparatus and has particular relation to apparatus for forming tools of very hard material such as tungsten carbide. For the sake of brevity and concreteness, this application and its claims will refer to tungsten carbide in discussing this material but this expression should be taken to mean not only tungsten carbide but also other hard materials which are its patentable equivalents. In certain of its specific aspects this invention is also applicable to the grinding of softer materials such as steel particularly where high precision is required.

Among the tungsten carbide tools which have come into wide use are tungsten carbide bars of generally polygonal cross section having plane surfaces. The apices of such tools are usually rounded. The cross sections of the tools are usually regular polygons and they may be squares, hexagons or even polygons having a greater number of sides. The square tools are in wide use. The cross section may also be diamond shape; that is, the shape of a parallelogram with two acute angles and two obtuse angles. But among the tools which have come into widest use are those having the cross-section of an equilateral triangle.

The forming of a tool having any polygonal cross-section imposes the condition of grinding a body having planes at an angle of $$\frac{(n-2)\ 180}{n}$$

degrees where $n$ is the number of sides. When the cross-section is triangular the angle between the planes is 60°. A serious problem is thus presented in grinding the planes which is particularly severe in the case of a triangular tool. A similar problem is presented in grinding a diamond shaped tool where the acute angles may be of the order of 55°. Still another condition which materially increases the difficulty is the high accuracy which must be maintained in grinding the surfaces. For ordinary tools of the type under consideration, the accuracy is of the order of at least one one-thousandth of an inch. Tools used widely, particularly in the automotive industry, are required to be ground to at least plus or minus twenty-five hundred thousandths of an inch.

Since tungsten carbide is a very hard material, it cannot be ground with ordinary abrasives and the grinding means used is ordinarily a so-called diamond wheel, that is a grinding wheel having diamond powder imbedded in its surface. The diamond particles protruding from the surface of such a wheel necessarily are even harder than the tungsten carbide.

In accordance with the teachings of the prior art, tools of polygonal cross-section of the type just described have been ground laboriously by hand. This grinding consumes long periods of time and the tools are costly.

It is, accordingly, broadly an object of this invention to provide apparatus for grinding work pieces of the tungsten carbide type, and under certain circumstances softer materials such as hardened steel, into tools, particularly tools having a polygonal cross-section, the tools once formed having predetermined dimensions within close tolerances.

Another object of this invention is to provide apparatus for forming accurate tungsten carbide tools, particularly tools having a polygonal cross-section, at a low cost.

A specific object of this invention is to provide apparatus for producing triangular tools, square, and diamond shaped tools of tungsten carbide at a low cost.

The invention contemplates the provision of apparatus for rotating the work piece to be ground in contact with a grinding surface coaxially with a cam having a contour such as to produce the final shape in the work piece. The cam cooperates with a cam follower which causes the cam and work piece to be oscillated back and forth in accordance with the contour of the cam. The work piece during this motion is in engagement with the grinding surface which forms the work piece in the manner desired.

This invention arises from the realization that because of the hardness of the work piece and of the grinding surface the forces between the work piece and the grinding surface while the grinding takes place are very large and for this reason the work piece and cam as they are rotated and oscillated must be firmly supported and firmly journalled. In accordance with the invention then, the work piece and cam are mounted to pivot about a rigid pivotal axis which, in accordance with one aspect of the invention, may be a rigid shaft and in accordance with another aspect of the invention may consist of oppositely disposed tapered stub shafts. In accordance with a further aspect of this invention, relative movement other than the pivotal movement of the mounting of the work piece and cam about their pivot is limited by journalling the mounting in anti-friction bearings. In addition, the lateral movement of the work piece and cam is limited by mounting the work piece and the cam to rotate on anti-friction bearings.

In providing anti-friction bearings for the latter purpose, it has been discovered that difficulty is introduced because of the tendency of the cam follower to slip relative to the cam particularly in the regions where the cam moves to form the apices of the work piece and where the forces between the work piece and the grinding surface are a maximum. In accordance with the invention this tendency to slip is suppressed by providing braking means between the shaft carrying the work piece and cam and the mounting for the forming apparatus.

In accordance with a further aspect of the invention, the work piece before being formed is provided at the end where it engages the work spindle (live or driving center) with a tetrahedral surface corresponding in its number of sides to the desired cross-sectional, polygonal form of the work piece. The work spindle is provided with a center having a mating tetrahedral surface so that when the work piece is mounted on the work spindle the work piece and the work spindle are precisely engaged. One of the edges of the tetrahedral surface in the work piece may be marked and the work spindle may be correspondingly marked so that if at any time the work piece is removed from the mounting, before the grinding is complete, it may be replaced in the spindle after removal in the same way as it had been inserted before removal. The tetrahedral surface in the work piece may be either of the reentrant type or of the projecting type and the mating surface of the spindle may correspondingly be of the projecting or reentrant type.

In accordance with a further aspect of this invention, the support for the work is so mounted relative to the center of the grinding surface that the line through the center of the grinding surface which is perpendicular to the line perpendicular to the axis of the support and passing the highest point of the arc through which the center of the work piece moves, passes not through the lowest points of this arc, but through points intermediate the lowest point and the highest point of the arc and preferably the highest point. This materially improves the accuracy of the grinding operation.

The novel features considered characteristic of this invention are set forth generally above. The invention itself both as to its organization and its method of operation, together with additional objects and advantages thereof, will be understood from the following description of specific embodiments taken in connection with the accompanying drawings, in which:

The invention will be described in detail in its application to the grinding of triangular tools. The work piece W from which such a tool is made in the practice of this invention may initially be a rod of tungsten carbide of any form; for example, of circular cross section, but in accordance with the preferred practice of this invention the piece W is initially of equilateral triangular form. The dimensions of the work piece W should initially be such with relation to the final tool that only a relatively small quantity of material, for example, .1 inch, need be ground away at the centers of the sides of the triangle in forming the tool to the accuracy desired. A work piece W of this type may be molded from tungsten carbide powder.

Figure 1:
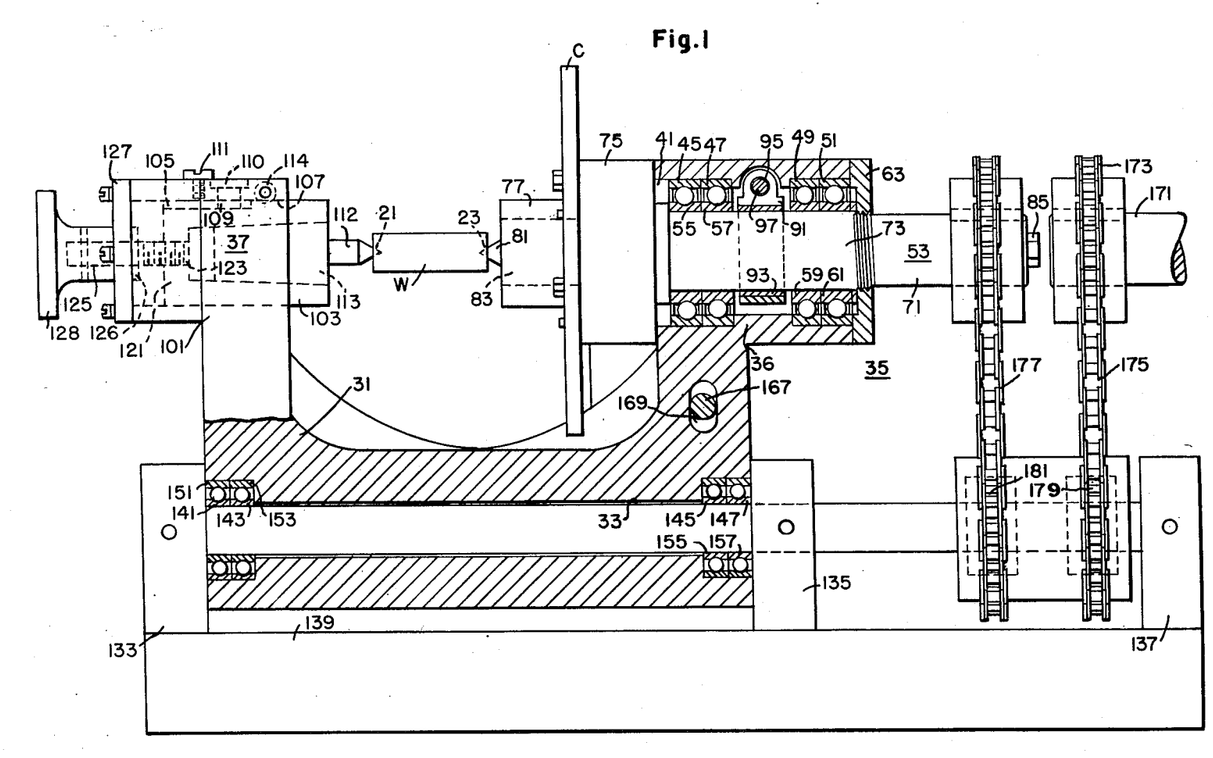
Figure 1 is a view in rear elevation, partly in section, of an embodiment of this invention.
Figure 2:
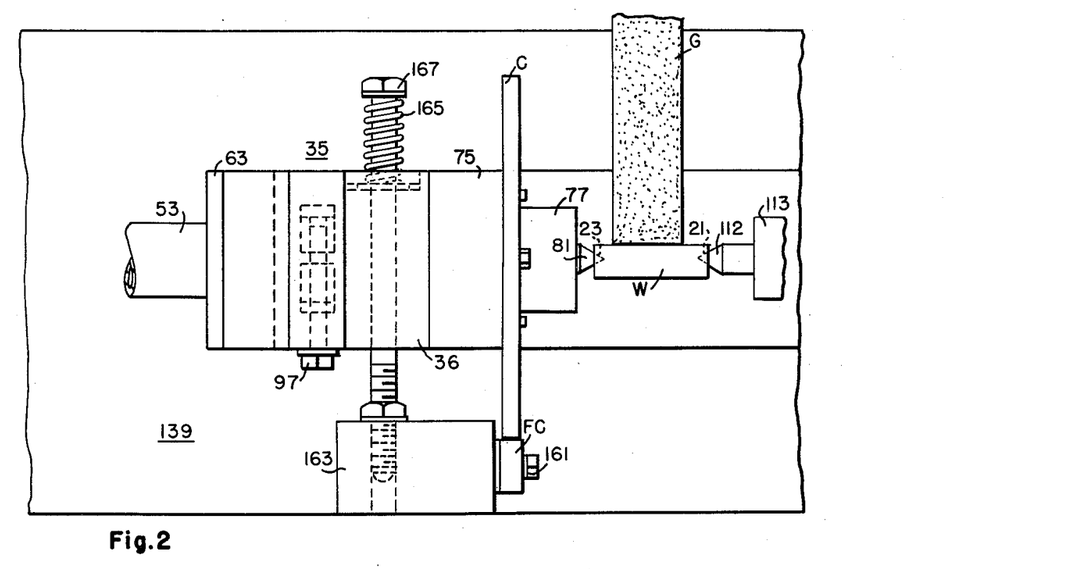
Fig. 2 is a top view of the embodiment shown in Fig. 2.
Figure 3:
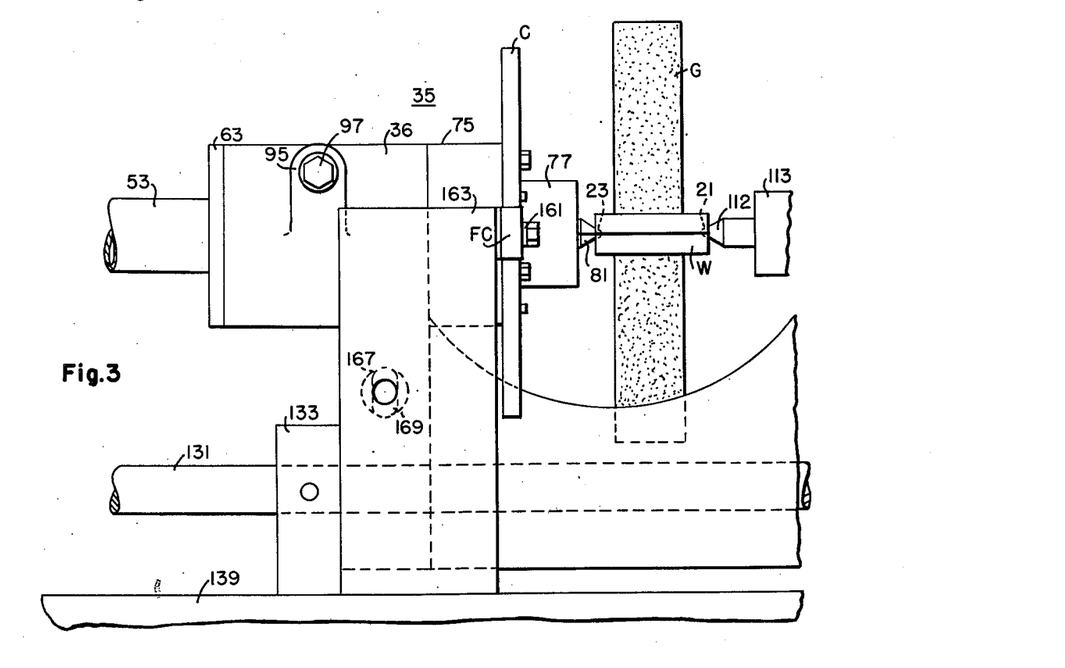
Fig. 3 is a view in front elevation of a part of the embodiment shown in Fig. 2.
Figure 4:
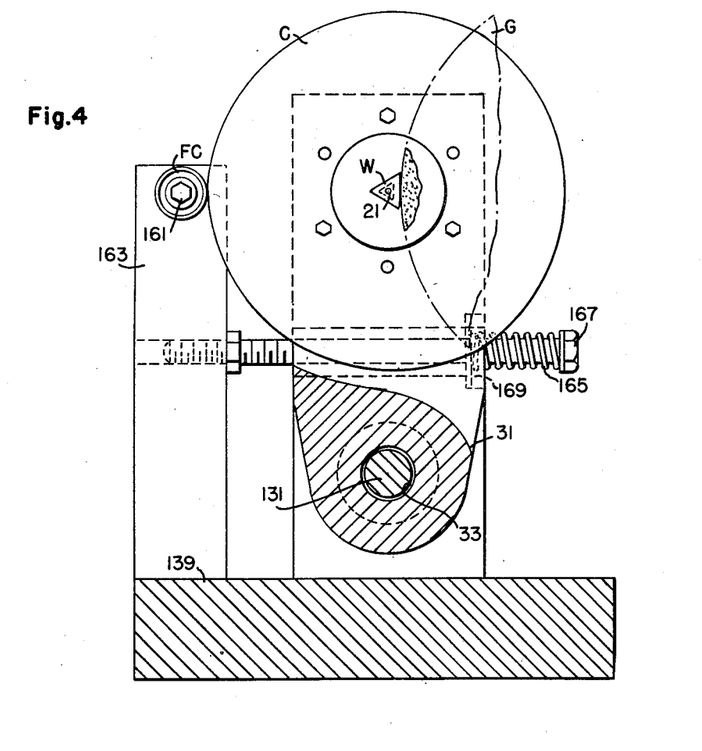
Fig. 4 is a view in transverse section looking toward the cam of the embodiment shown in Fig. 2.
Figure 5:
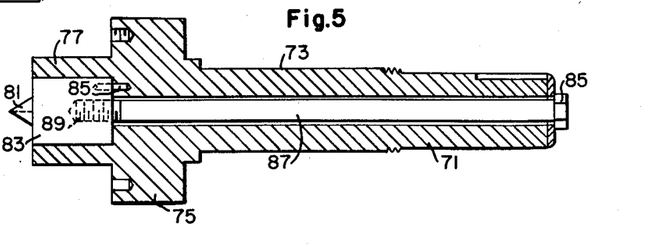
Fig. 5 is a view in longitudinal section of the work spindle.
Figure 6:
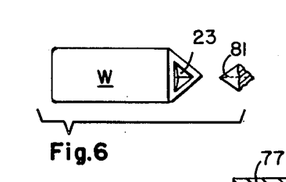
Fig. 6 is a view in perspective of a triangular tool which is made in the practice of this invention.

The work piece W is provided in one of its ends with an ordinary conical opening 21. This opening is accurately disposed in the center of the end surface. In the other end the work piece W is, in accordance with this invention, provided with a tetrahedral opening 23 (see Fig. 5) corresponding in its surface structure to the surface to be ground. This tetrahedral opening 23 may be molded into the work piece when it is being formed or it may be cut into the work piece usually by means of an arc discharge between the end of the work piece and an electrode.

The apparatus shown in Figs. 1 through 4 includes a cradle 31 of rigid structure. This cradle is of generally U shape having a cylindrical opening 33 in the web portion of the U. The cradle 31 has a head stock 35 and a tail stock 37. The head stock 35 includes a bearing block 36 of generally L shape structure having an opening 41 through its center in which the fixed races 45, 47, 49, 51 of a plurality of ball bearings are supported. A shaft or spindle 53 engaging the rotating races 55, 57, 59, 61 extends through the opening and rotates on the bearings. The bearings 45—55 and 51—61 and elsewhere in all modifications of this apparatus are ABEC-7 superprecision bearings. A retaining nut 63 for preventing the spindle 53 from moving transversely is screwed onto the spindle 53.

The spindle 53 is hollow and has a thin section 71 at its end external to the head stock 35, an intermediate thicker section 73, and a flange 75 and a cup shaped section 77 extending into the cradle 31. The work center 81 extends integrally from the center of a block 83 which fits snugly (is a tap fit) into the section 77 and is positioned by a pin 85. The block 83 is held securely by a bolt 87 which extends through the spindle 53 and engages a thread 89 in the block. A cam C is pinned and bolted centrally to the flange 75. The work center 81 is of tetrahedral shape and so formed as to mate with the tetrahedral opening in the work piece W.

Intermediate the bearings 45—55 to 51—61 the bearing block 36 is provided with a friction brake 91. This brake 91 is in the form of a split ring clamp having a lining 93 of bronze and ears 95 at its open end. The ring may be tightened or loosened by a screw 97, which passes through the ears 95. When the ring 91 is tightened, the bronze lining firmly engages the shaft 53 and operates as a brake.

Figure 10:
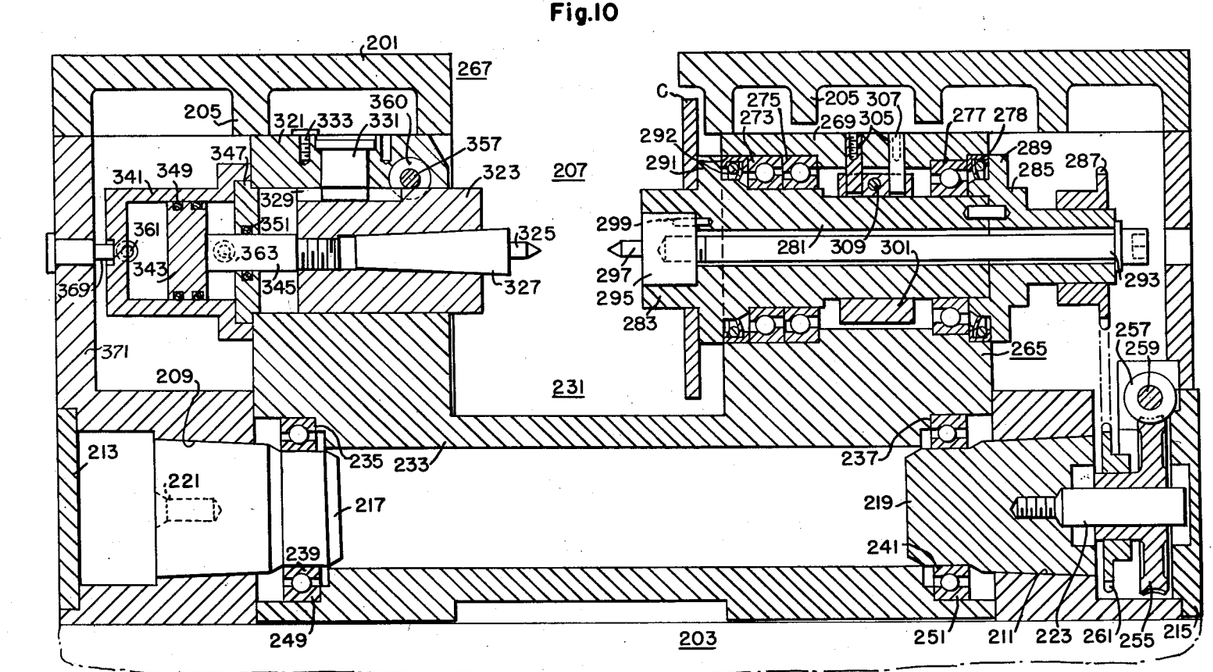
Fig. 10 is a view in longitudinal section of a modification of this invention.
Figure 13:
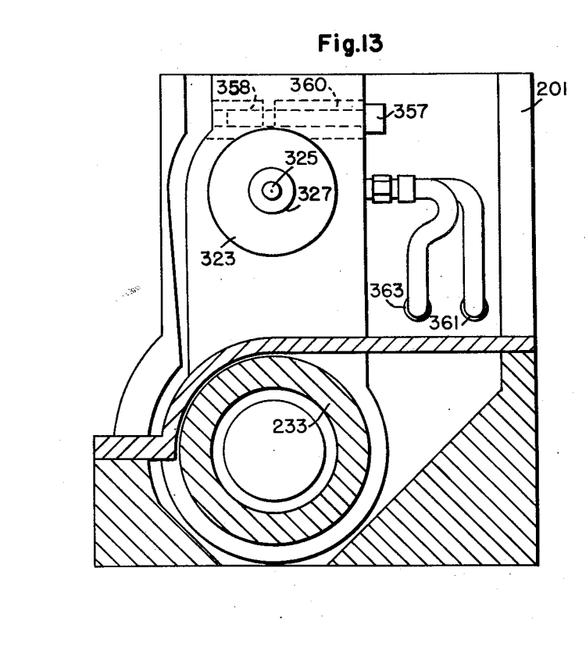
Fig. 13 is a view in end elevation of the other end of the modification shown in Fig. 9.

The tail stock 37 also includes a hollow or support 101. A shell 103 having a key way 105 fits snugly in the opening 107 in the block 101 and may be held from rotating by a key 109 integral with an adapter 110 which slips into the block 101 and is held by a set screw 111. The shell 103 is held in the block 101 by a cylindrical binder clamp 114 similar to that used in the tail stock of an engine lathe (see Figs. 10 and 13). The work center 112 (or dead center) is mounted on a tapered block 113 which may be secured in a tapered opening in the shell 103. The work center 112 is conical and mates with the conical opening 21. The shell 103 has a block 121 in its outer end. This block has a central thread 123 into which a threaded section 125 screws. The section 125 is prevented from moving longitudinally by a shoulder 126 which engages end plate 127 and by the face of the wheel 128 which engages plate 127 and when the section 125 is turned it moves the shell 103 in or out.

The cradle 31 is pivotally mounted on a fixed shaft 131 which is secured to projections 133, 135 and 137 extending from a bed plate 139 which may be the bed plate of the machine (not shown) on which the grinding operation is to be performed. The cradle 31 is journalled on the shaft on ball bearings, the fixed races 141, 143, 145, 147 of which are secured to the shaft and the movable races 151, 153, 155, 157 of which are carried by the cradle. The shaft 131 is secured in the projections 133, 135, 137 by pins which are inserted after the shaft has been passed through the opening 33 and the bearings in the cradle 31.

The cam C is held in resilient engagement with a roller or cam follower FC which is mounted on a pin 161 extending from an upright 163 secured to the bed plate 139. The roller FC is preferably journalled on ball bearings (not shown). The cam C is urged into engagement with the roller FC by a spring 165 compressed against the one side of the cradle 31 by a bolt 167 which passes through an opening 169 in the head stock 35 and screws into the upright 163 below the roller FC.

The work-spindle 53 is rotated from a motor (not shown) through a drive shaft 171. The shaft 171 carries a sprocket wheel 173 which is coupled through a pair of sprocket chains 175 and 177 to the spindle 53. The coupling is effected through a pair of idler sprocket wheels 179 and 181 mounted to rotate together about the fixed pivot shaft 131. As the cam C rotates the roller FC causes the cradle 31, the cam C and the work piece W carried by the spindle 53 to oscillate back and forth. The oscillation is synchronized with the rotation of the spindle 53. The rocking of the cradle is such as to give the work piece finally the desired form; once the work piece approaches the form of the final tool the work piece W is in continuous engagement with the wheel G as the cradle rocks.

In the practice of the invention, the work piece W is mounted between the work spindle (live center) and the work center (dead center) with the tetrahedral surface 5 of the work spindle engaging the tetrahedral surface 23 of the work W. When so mounted the work piece W and the cam C are rotated, the work piece engaging the grinding surface G. The cam C in rotating in engagement with the cam follower FC causes the cradle 31 to rock about its pivot. As the cradle rocks the work piece W is moved toward and away from the grinding surface G in accordance with the contour of the cam and the work piece is formed into the desired configuration. Either the bed plate 139 or the grinding surface G, and preferably the latter, may be provided with a lateral feed so that the grinding may be effected smoothly without taking too large a cut. Initially the grinding wheel is fed laterally to a position such that the parts of the work piece which are ground off are only those which depart most from the desired dimensions of the tool. As these final dimensions are approached the wheel G is fed to a position at which it continuously contacts the work W. At this point the flat sides W are as well as the apices of the work ground. Because of the solidity of the structure of the cradle 31, of the pivot shaft 131 and the restriction in lateral movement imposed by the anti-friction bearings, the forces which are produced between the grinding surface G and the work piece W are absorbed and do not displace either the cradle 31 or the work piece W and the grinding is accurately performed. The brake 91 prevents the spindle 53 from accelerating and decelerating as the pressure between the cam and cam follower increases and decreases. In general it is desirable that cam C should have as large a periphery as practicable. The cam should be as large as practicable. Thus in apparatus which has been constructed and operated satisfactorily, the cam has a maximum radius of 3⅛ inches and the minimum radius of different cams varies up to a range at which the minimum diameter is .600 inch less than the maximum radius. A tool which would be produced with this optimal cam would have an inscribed circle radius less by .600 inch than its circumscribed circle radius. The contour of the cam determines the form of the work piece. The cam follower FC may be on the same side of the cam as the wheel G rather than on the opposite side, but in such case the cam contour is different.

To achieve the highest accuracy which is desired in the tool under consideration, the arc over which the work moves must be taken into account. This feature of the invention will now be discussed, and the detailed operation of the apparatus will be described in connection with Figs. 7, 8 and 9.

Figure 7:
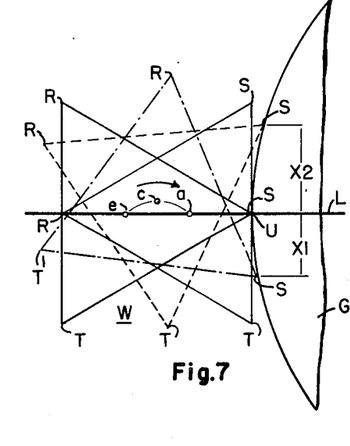
Figs. 7, 8 and 9 are diagrammatic views illustrating the manner in which this invention is used and also one aspect of this invention.
Figure 8:
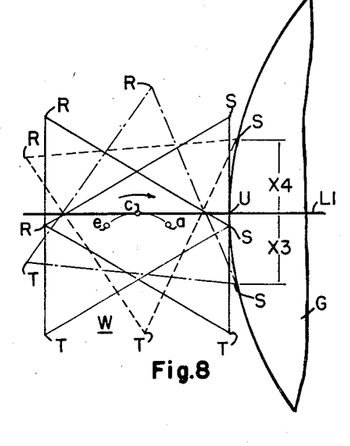
Figure 9:
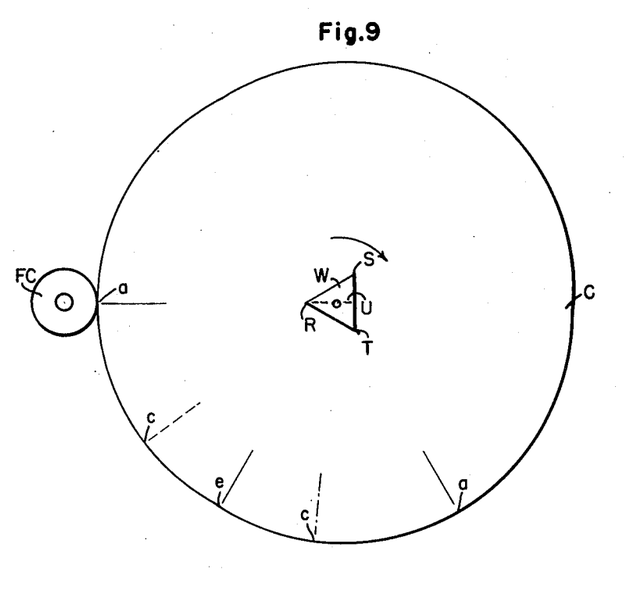

Figs. 7 and 8 show the progressively changing positions of the work piece W relative to the wheel G as the work piece W rotates and oscillates. In Fig. 9 the contour of the cam C is shown correlated with Figs. 7 and 8.

In Figs. 7 and 8, the arcs over which the center of the work piece W moves are shown in medium heavy lines. The radius of curvature of the arcs is shown smaller than it actually is for the purpose of clarity. The work piece is shown as a simple triangle RST having an altitude RU. The triangle RST is shown in four positions one each when it has its center at the lowest points $a$ and $e$ of the arc and two when it has its center at the highest point C of the arm. The points of engagement of the cam C and follower FC corresponding to the four positions are shown in Fig. 9. It is seen that point $a$ corresponds to a point on cam C at which the axis of spindle 53 is nearest the center of wheel G, point $e$ to point on cam C at which the axis of shaft C is most remote from the center of wheel G and C to intermediate points on the cam. The lines L and L1 from the center of the wheel G perpendicular to the line perpendicular to the axis of shaft 131 passing through the center are shown heavy. The direction of rotation of cam and work piece is shown in Figs. 7 through 9 by arrows.

With reference to Fig. 7 assume that the work is in the position shown by the full line triangle at center $a$ with altitude RU aligned with center line L. As the spindle 53 rotates and rocks, the center of the work moves to position C and the work assumes the position of the broken-line triangle. Next the center rocks to position $e$ and the work assumes the position of the full line triangle with its apex S at the surface of wheel G. Finally, the center returns to C and the work assumes the position of the dash-dot triangle having its apex S below the line L. It is seen that the distance X1 of the apex S' below line L is less than the distance X2 of the apex S above line L. This difference introduces an inaccuracy.

The structure illustrated in Fig. 8 substantially eliminates this inaccuracy. In this case the line L1 which corresponds to L intersects the arc at the highest point C. The work is again represented as in Fig. 7 with its center in four successive positions $a$, $c$, $e$, $c$. It is seen that in this case X3 the distance from lower apex S to line L1 is substantially equal to X4 the distance from upper apex S to line L. Thus the inaccuracy is eliminated.

The apparatus shown in Figs. 10 through 14 includes a container 201 of a metal such as cast iron adapted to be mounted on the bed plate 203 of the machine with which the apparatus, in accordance with this invention, is to operate. The container 201 has a plurality of strengthening ribs 205 and includes a centrally disposed slot 207 within which the work piece W is to be disposed and through which the grinding wheel G projects to engage the work piece. The container 201 also includes a plurality of oppositely disposed tapered bored holes 209 and 211 in its lower portion. These holes are closed by plugs 213 and 215, respectively. Tapered stub shafts 217 and 219 are secured within the holes 209 and 211, respectively. The shafts 217 and 219 are provided with tapped openings 221. The thread 221 in plug 217 can accommodate a threaded pin which may be used to pull out the shaft 217. A flanged pin 223 is screwed into the thread in plug 219. The stub shafts 217 and 219 are of solid rigid structure.

The apparatus also includes a cradle 231 and the stub shafts 217 and 219 serve as a support about which the cradle 231 is adapted to pivot. The cradle 231 is provided with a hollow cylindrical opening 233 near its base and this opening has at its end shoulders 235 and 237. The cradle 231 is pivotally mounted on the stub shafts by anti-friction ball bearings, the fixed races 239 and 241 of which are firmly secured near the ends of the shafts. The movable races 249 and 251 of the ball bearings are engaged in the recesses in the cradle formed by the shoulders 233 and 235.

A worm wheel 255 is rotatably mounted about the pin 223. This worm wheel is adapted to be driven from a worm 257 on a shaft 259 which extends through the container. The worm is driven by a motor (not shown). The hub of the worm wheel has an inward extension on which a sprocket wheel 261 is rigidly secured, in such manner that when the worm wheel rotates the sprocket wheel is also caused to rotate.

The cradle 231 has a head stock 265 and a tail stock 267. The head stock includes a bushing or bearing block 269 having an opening therethrough which supports the fixed races 273, 275, 277 of ball bearings. The bushing is provided with shoulders against which the inner race 275 of the bearings near the inner end and the race 277 of the bearings near the outer end are held. A hollow flanged shaft or spindle 281 is rotatable on these bearings 273, 275, 277. The inner end of the shaft has a cup shaped stem 283. This spindle 281 has bolted thereto a flanged stub 285 which extends outwardly from the outer end of the bushing 269. This stub 285 carries a sprocket wheel 287 on its outer end. The latter is aligned with the sprocket wheel 261 on the extension from the hub of the worm wheel 255. The flange 289 of the stub 285 engages the end of the bushing 269 and serves as a closure for retaining the bearing 277. The lubricant of the bearings are retained by oil seals 278. The flange 291 at the other end of the shaft has a shoulder which serves to retain the bearings 273 and 275. The lubricant for these bearings is also retained by oil seals 292. The inner surface of the flange 291 of the shaft 281 has the cam C centrally secured thereto. The openings in the shaft 281 and stub 285 are aligned and accommodate a bolt 293 on the end of which a block 295 carrying the work spindle 297 is mounted. The block 295 fits snugly (tap fit) into the cup 283. The work center 297 is positioned with reference to the spindle 281 by a pin 299 which extends through the face of the work spindle block 295 and the flange 283.

The spindle 281 is engaged between the sets of bearings 273—275 and 277 by a brake. This brake comprises a bronze band 301 split at one point along its periphery. This band is secured to the bushing 269 by a pair of pins 305. The pins 305 have threads 307 so that they may be removed. The band 301 may be tightened or released by a screw 309. The band 301 engages the steel of the shaft 281 to an extent determined by the extent to which the band is tightened together or relaxed.

The tail stock 267 has a bored arm or support 321 having a central opening. A cylinder 323 having a tapered central opening is slidably mounted within the opening in arm 321. The work center 325 extends centrally from a tapered body 327 which engages the tapered opening in the cylinder. The cylinder has a key way 329 on its periphery. The key way 329 is engaged by a key 331 which fits snugly in an opening in the arm 321. A pair of screws 333 holds the key in any position in which it is set. The work center 327 may be set in any position by operation of a fluid system. This fluid system includes a cylinder 341 bolted to the bushing 321. Within the cylinder 341 a piston 343 is slidable. A stem 345 extends from the piston and is screwed into the work center holder 323 so that the latter slides with the piston. The stem 345 extends through a disc 347 which engages the arm 321. O rings 349 and 351 are provided for packing between the piston 343 and the cylinder 341 and also between the stem 345 and the internal surface of the disk 345. To assure that the work center holder 323 will remain rigid in any position, it is secured by a bolt 357 which screws into a threaded section 358 through a sleeve 360.

The cylinder 341 is provided with inlet and outlet openings 361 and 363 into which inlet and outlet tubes 365 and 367 for fluid are engaged. The admission of fluid to the tube 365 on one side of the piston 343 causes the piston and the work center 325 to move inwardly. The admission of fluid on the other side causes the piston and the work center to move outwardly. The fluid is admitted in either direction by means of valves (not shown) which permit the fluid on the side toward which the piston is moving to escape through the associated tube. To properly center the work center assembly a pin 369 projects through the walls 371 of the container 201.

The apparatus includes a cam follower assembly CF1 (Figs. 11, 12 and 14) which comprises a cylinder 381 having a cylindrical transverse opening 383 centrally therethrough. Within the opening the fixed races 385 and 387 of a pair of ball bearings are mounted in spaced relationship. The cylinder 381 also has a slot 389 extending longitudinally into one of its faces and communicating with the opening 383 in which the fixed races 385 and 387 are mounted. A cam follower roller 391 is mounted to rotate with a shaft 393 which passes through the transverse opening 383 in the cylinder 381 and has secured thereto the rotating races 395 and 397 of the ball bearings. The cylinder 381 is so mounted relative to the cam C that the periphery of the cam C extends into the slot 389 and engages the cam follower roller 391.

Figure 11:
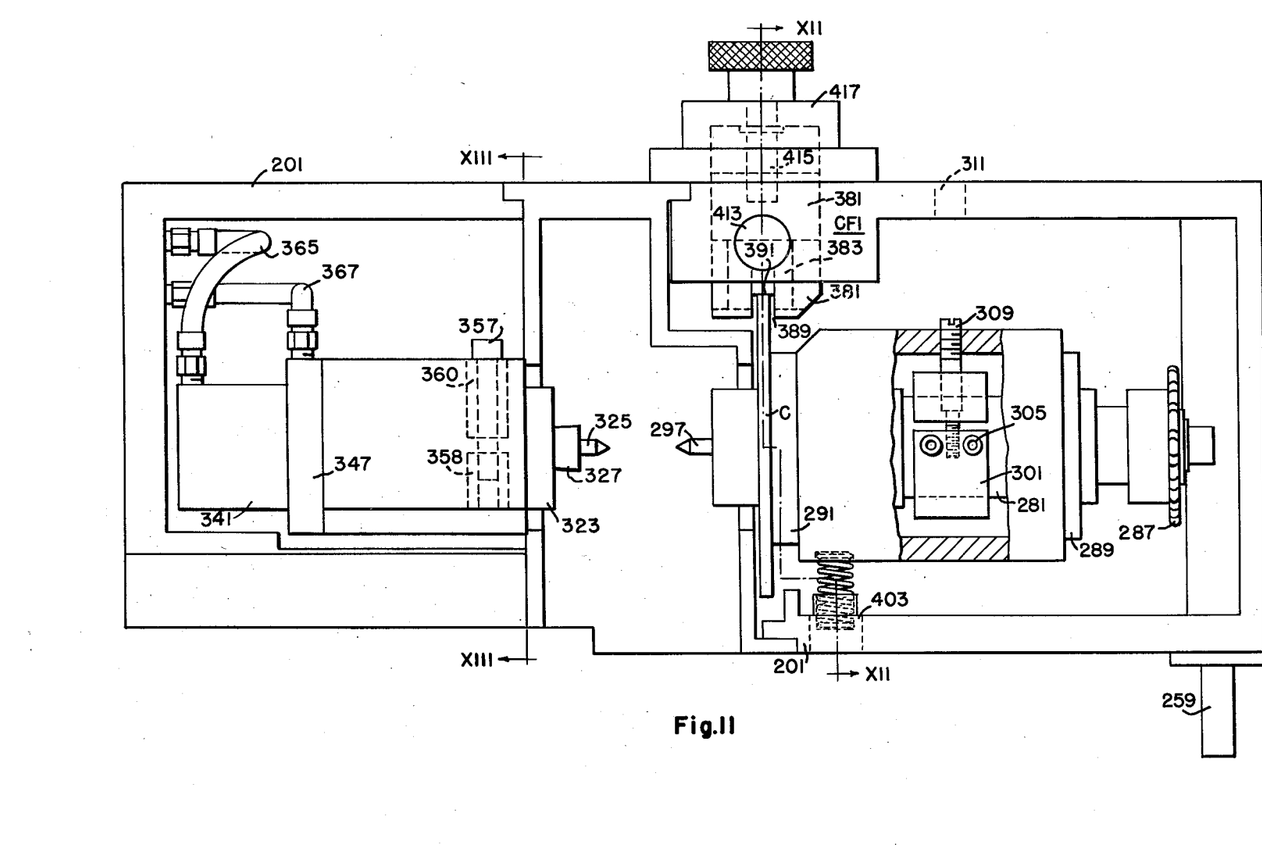
Fig. 11 is a plan view, partly in section, of the modification shown in Fig. 9 with the top removed.
Figures 12, 14:
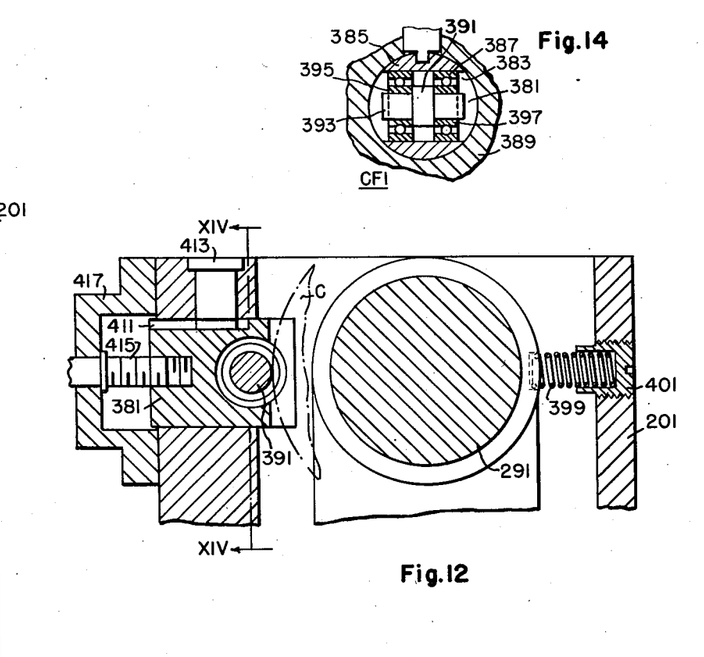
Fig. 12 is a view in end elevation and partly in section of one end of the modification shown in Fig. 9.
Fig. 14 is a view in transverse section of the cam follower assembly of the modification shown in Fig. 9.

The cam C is urged into engagement with the roller 391 by a compression spring 399 which engages the bushing 269 on one side and is engaged by a plug 401 screwed into the container 201 on the other side. The compression spring 399 extends through a tubular projector 403 extending from the internal surface of the container 201. It is important that the center of the compression spring 399 shall be as near as practicable to the center line defined by the cam C and the cam follower roller 391. The cylinder 381 which holds the cam follower roller 391 is provided with a key way 411 which is engaged by a key 413 that may be screwed into the casing to hold the cam follower FC1 in any position in which it is set. The cam follower may be set in different positions by an adjusting screw 415 which extends through a boss 417 in the container 201 and engages the cylinder 381.

The modification of this invention shown in Figs. 9 through 14 may be operated in the same manner as the modification of this invention shown in Figs. 1 through 9. In this case, the work piece W is mounted between the work center 297 and the work center 325 and the work center 297 is rotated rotating the work piece and the cam C. As the cam C engages the cam follower roller 391, the cradle 231 is rocked back and forth in accordance with the contour of the cam. The work piece W is engaged by a diamond grinding wheel (not shown in Figs. 9 through 14) extending through the slot 207 in the casing 201 and as the cradle rocks back and forth the work piece W is formed.

In accordance with the preferred practice of this invention, the grinding wheel is provided with a lateral feed so that it may be properly positioned with reference to the work piece. The center line from the work piece which is perpendicular to the line perpendicular to the pivot center 217—219 and extending through the center of the rocking arc should intersect the rocking arc at points between the highest and the lowest points and not at the lowest points.

While several specific embodiments of this invention have been disclosed herein, many modifications thereof are feasible. Thus while as shown herein the work center is fixed, a system in which the work center is rotatable preferably about anti-friction bearings is within the scope of this invention. Where the work W is very short it may be secured in a chuck on shaft 53 rather than between centers (112 and 81 or 277 and 325). The tail stock may also be adjustable relative to the head stock but the adjustable mounting must be firm. Finally there are situations in which this invention is applicable to the grinding of hard steel and like material. This invention then is thus not to be restricted except insofar as is necessitated by the spirit of the appended claims.

I claim as my invention:

1. Apparatus for forming a work piece of the tungsten-carbide type or the like into a body bounded by a plurality of plane surfaces at an angle to each other, said body when formed having predetermined dimensions within a tolerance of the order of plus or minus .001 inch, the said apparatus comprising in combination a hollow cradle having spindles mounted thereon at least one of said spindles being a driving spindle having an axis of rotation and said cradle being movable in a direction generally at right angles to said axis, a cam mounted on said driving spindle to be rotated by said driving spindle, means mounting said work piece on said driving spindle to be rotated by said driving spindle, a grinding wheel mounted adjacent said work piece so that it is in grinding engagement with different parts of said work piece as said work piece is rotated, a cam follower mounted adjacent said cam so as to engage said cam over its contour as said cam is rotated, said follower and grinding wheel being mounted separately from said cradle so that said cradle is movable relative to said follower and wheel, resilient means mounted coactively with said cradle and follower to urge said cam and follower into resilient engagement with each other, said grinding wheel and follower being mounted so that the region of engagement of said grinding wheel and work piece is on the opposite side of said axis of said spindle from the region of engagement of said cam and follower so that the force exerted by said resilient means is substantially equal to the difference between the force exerted by said follower and the force exerted by said wheel, and a brake on said spindle cooperative with said spindle to restrain said spindle from accelerating in the regions where the variation of the force exerted between said work piece and wheel is sharp, said mounting means for said work piece and said mounting means for said cam including locating means for orienting said work piece relative to said cam, said locating means orienting said work piece so that the high points on said work piece correspond to the low points on said cam.

2. Apparatus for forming a work piece of the tungsten-carbide type or the like into a body bounded by a plurality of plane surfaces at an angle to each other, said body when formed having predetermined dimensions within a tolerance of the order of plus or minus .001 inch, the said apparatus comprising in combination a hollow cradle having spindles mounted thereon at least one of said spindles being a driving spindle having an axis of rotation, pivotal mounting means for said cradle, on which said cradle is mounted, said cradle being capable of rocking about said mounting means in a direction generally at right angles to said axis, a cam mounted on said driving spindle to be rotated by said driving spindle, means mounting said work piece on said driving spindle to be rotated by said driving spindle, a grinding wheel mounted adjacent said work piece so that it is in grinding engagement with different parts of said work piece as said work piece is rotated, a cam follower mounted adjacent said cam so as to engage said cam over its contour as said cam is rotated, said follower and grinding wheel being mounted separately from said cradle so that said cradle is movable relative to said follower and wheel, resilient means mounted coactively with said cradle and follower to urge said cam and follower into resilient engagement with each other, said grinding wheel and follower being mounted so that the region of engagement of said grinding wheel and work piece is on the opposite side of said axis of said spindle from the region of engagement of said cam and follower so that the force exerted by said resilient means is substantially equal to the difference between the force exerted by said follower and the force exerted by said wheel, and a brake on said spindle cooperative with said spindle to restrain said spindle from accelerating in the regions where the variation of the force exerted between said work piece and wheel is sharp, said mounting means for said work piece and said mounting means for said cam including locating means for orienting said work piece relative to said cam, said locating means orienting said work piece so that the high points on said work piece correspond to the low points on said cam.

3. Apparatus for forming a work piece of the tungsten-carbide type or the like into a body bounded by a plurality of plane surfaces at an angle to each other, said body when formed having predetermined dimensions within a tolerance of the order of plus or minus .001 inch, said work piece having a center in one of its ends in the form of a three dimensional surface corresponding to the cross section of said body, the said apparatus comprising in combination a hollow cradle having spindles mounted thereon at least one of said spindles being a driving spindle having an axis of rotation and said cradle being movable in a direction generally at right angles to said axis, one of said spindles having a center to engage said center in said work piece, said spindle center having a three dimensional surface such as to mate with the three dimensional surface in said work piece, a cam mounted on said driving spindle to be rotated by said driving spindle, means mounting said work piece on said driving spindle to be rotated by said driving spindle, a grinding wheel mounted adjacent said work piece so that it is in grinding engagement with different parts of said work piece as said work piece is rotated, a cam follower mounted adjacent said cam so as to engage said cam over its contour as said cam is rotated, said follower and grinding wheel being mounted separately from said cradle so that said cradle is movable relative to said follower and wheel, resilient means mounted coactively with said cradle and follower so as to urge said cam and follower into resilient engagement with each other, said grinding wheel and follower being mounted so that the region of engagement of said grinding wheel and work piece is on the opposite side of said axis of said spindle from the region of engagement of said cam and follower so that the force exerted by said resilient means is substantially equal to the difference between the force exerted by said follower and the force exerted by said wheel, and a brake on said spindle cooperative with said spindle to restrain said spindle from accelerating in the regions where the variation of the force exerted between said work piece and wheel is sharp, said mounting means for said work piece and said mounting means for said cam including locating means for orienting said work piece relative to said cam, said locating means including said center of said one spindle and orienting said work piece so that the high points on said work piece correspond to the low points on said cam.

4. Apparatus for forming a work piece of the tungsten-carbide type or the like into a body bounded by a plurality of plane surfaces at an angle to each other, said body when formed having predetermined dimensions within a tolerance of the order of plus or minus .001 inch, the said apparatus comprising in combination a hollow cradle having spindles mounted thereon at least one of said spindles being a driving spindle journaled for rotation on anti-friction bearings in said cradle and having an axis of rotation and said cradle being movable in a direction generally at right angles to said axis, a cam mounted on said driving spindle to be rotated by said driving spindle, means mounting said work piece on said driving spindle to be rotated by said driving spindle, a grinding wheel mounted adjacent said work piece so that it is in grinding engagement with different parts of said work piece as said work piece is rotated, a cam follower mounted adjacent said cam so as to engage said cam over its contour as said cam is rotated, said follower and grinding wheel being mounted separately from said cradle so that said cradle is movable relative to said follower and wheel, resilient means mounted coactively with said cradle and follower so as to urge said cam and follower into resilient engagement with each other, said grinding wheel and follower being mounted so that the region of engagement of said grinding wheel and work piece is on the opposite side of said axis of said spindle from the region of engagement of said cam and follower so that the force exerted by said resilient means is substantially equal to the difference between the force exerted by said follower and the force exerted by said wheel, and a brake on said spindle cooperative with said spindle to restrain said spindle from accelerating in the regions where the variation of the force exerted between said work piece and wheel is sharp, said mounting means for said work piece and said mounting means for said cam including locating means for orienting said work piece relative to said cam, said locating means orienting said work piece so that the high points on said work piece correspond to the low points on said cam.

5. Apparatus for forming a work piece of the tungsten-carbide type or the like into a body bounded by a plurality of plane surfaces at an angle to each other, said body when formed having predetermined dimensions within a tolerance of the order of plus or minus .001 inch, the said apparatus comprising in combination a hollow cradle having spindles mounted thereon at least one of said spindles being a driving spindle having an axis of rotation, pivotal mounting means for said cradle, on which said cradle is mounted, said cradle being capable of rocking about said mounting means in a direction generally at right angles to said axis, said pivotal mounting means including oppositely disposed coaxial tapered stub shafts on which said cradle is journaled in anti-friction bearings, a cam mounted on said driving spindle to be rotated by said driving spindle, means mounting said work piece on said driving spindle to be rotated by said driving spindle, a grinding wheel mounted adjacent said work piece so that it is in grinding engagement with different parts of said work piece as said work piece is rotated, a cam follower mounted adjacent said cam so as to engage said cam over its contour as said cam is rotated, said follower and grinding wheel being mounted separately from said cradle so that said cradle is movable relative to said follower and wheel, resilient means mounted coactively with said cradle and follower so as to urge said cam and follower into resilient engagement with each other, said grinding wheel and follower being mounted so that the region of engagement of said grinding wheel and work piece is on the opposite side of said axis of said spindle from the region of engagement of said cam and follower so that the force exerted by said resilient means is substantially equal to the difference between the force exerted by said follower and the force exerted by said wheel, and a brake on said spindle cooperative with said spindle to restrain said spindle from accelerating in the regions where the variation of the force exerted between said work piece and wheel is sharp, said mounting means for said work piece and said mounting means for said cam including locating means for orienting said work piece relative to said cam, said locating means orienting said work piece so that the high points on said work piece correspond to the low points on said cam.

6. Apparatus for forming a work piece of the tungsten-carbide type or the like into a body bounded by a plurality of plane surfaces at an angle to each other, said body when formed having predetermined dimensions within a tolerance of the order of plus or minus .001 inch, the said apparatus comprising in combination a hollow cradle having spindles mounted thereon at least one of said spindles being a driving spindle having an axis of rotation, pivotal mounting means for said cradle, on which said cradle is mounted, said cradle being capable of rocking about said mounting means in a direction generally at right angles to said axis, a cam mounted on said driving spindle to be rotated by said driving spindle, means mounting said work piece on said driving spindle to be rotated by said driving spindle, a grinding wheel mounted adjacent said work piece so that it is in grinding engagement with different parts of said work piece as said work piece is rotated, a cam follower mounted adjacent said cam so as to engage said cam over its contour as said cam is rotated, said follower and grinding wheel being mounted separately from said cradle so that said cradle is movable relative to said follower and wheel, resilient means mounted coactively with said cradle and follower to urge said cam and follower into resilient engagement with each other, said grinding wheel and follower being mounted so that the region of engagement of said grinding wheel and work piece is on the opposite side of said axis of said spindle from the region of engagement of said cam and follower so that the force exerted by said resilient means is substantially equal to the difference between the force exerted by said follower and the force exerted by said wheel, and a brake on said spindle cooperative with said spindle to restrain said spindle from accelerating in the regions where the variation of the force exerted between said work piece and wheel is sharp, said mounting means for said work piece and said mounting means for said cam including locating means for orienting said work piece relative to said cam, said locating means orienting said work piece so that the high points on said work piece correspond to the low points on said cam, said pivotal mounting means providing a pivot for said cradle whose axis is so disposed that the line from the center of rotation of said grinding wheel which is perpendicular to the vertical line between said pivotal axis and the highest point on the arc traveled by the center of said work piece intersects the arc substantially at said highest point.

References Cited in the file of this patent
UNITED STATES PATENTS

| | | |
|---|---|---|
| 1,323,056 | Hofmann | Nov. 25, 1919 |
| 1,373,779 | Tooker | Apr. 5, 1921 |
| 2,120,928 | Brump | June 14, 1938 |
| 2,179,213 | Green | Nov. 7, 1939 |
| 2,406,689 | Indge | Aug. 27, 1946 |
| 2,453,901 | Gonsett et al. | Nov. 16, 1948 |
| 2,559,534 | Green | July 3, 1951 |
| 2,629,208 | Legg | Feb. 24, 1953 |
| 2,660,836 | Green | Dec. 1, 1953 |
| 2,710,495 | Green | June 14, 1955 |
| 2,721,423 | Haussler | Oct. 25, 1955 |